United States Patent
Mori (10) Patent No.: US 8,105,167 B2
(45) Date of Patent: Jan. 31, 2012

(54) GAME MACHINE, GAME MACHINE CONTROL METHOD, INFORMATION STORAGE MEDIUM, AND NETWORK GAME SYSTEM

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 681 days.

(21) Appl. No.: 12/096,036

(22) PCT Filed: Oct. 19, 2006

(86) PCT No.: PCT/JP2006/320828
§ 371 (c)(1),
(2), (4) Date: Jun. 4, 2008

(87) PCT Pub. No.: WO2007/069390
PCT Pub. Date: Jun. 21, 2007

(65) Prior Publication Data
US 2009/0149260 A1 Jun. 11, 2009

(30) Foreign Application Priority Data
Dec. 16, 2005 (JP) .................................. 2005-364091

(51) Int. Cl.
*A63F 13/00* (2006.01)
(52) U.S. Cl. ................. 463/42; 463/40; 463/43; 463/20
(58) Field of Classification Search .................. 463/20, 463/25, 40, 42, 43
See application file for complete search history.

(56) References Cited

U.S. PATENT DOCUMENTS

| | | | |
|---|---|---|---|
| 5,820,463 A | 10/1998 | O'Callaghan | |
| 2002/0037767 A1* | 3/2002 | Ebin | 463/25 |
| 2002/0147047 A1* | 10/2002 | Letovsky et al. | 463/42 |
| 2002/0165630 A1* | 11/2002 | Arthur et al. | 700/91 |
| 2004/0087371 A1 | 5/2004 | Yamana et al. | |
| 2004/0087372 A1 | 5/2004 | Yamana et al. | |
| 2005/0021159 A1 | 1/2005 | Ogawa | |
| 2008/0300046 A1* | 12/2008 | Gagner et al. | 463/25 |

FOREIGN PATENT DOCUMENTS
EP   1 086 731 B1   5/2007
(Continued)

OTHER PUBLICATIONS
Supplementary European Search Report dated Aug. 31, 2009 along with the European Search Opinion in corresponding European Patent Application No. 06 82 1954.2.

(Continued)

*Primary Examiner* — Dmitry Suhol
*Assistant Examiner* — Brandon Gray
(74) *Attorney, Agent, or Firm* — Sughrue Mion, PLLC (57) ABSTRACT

A game machine is communicatively connected to a game server and display-outputs a game screen showing a content corresponding to the player's operation by exchanging data with the game server. The response time to the operation is stabilized, and consequently the player does not feel stress due to a variation of the response time to the operation. A reference time storage unit (38) stores a reference time from the player's operation to the display-output of the game screen showing contents corresponding to the player's operation. A waiting unit (32) awaits the display-output of the game screen showing a content corresponding to the player's operation according to the stored reference time.

12 Claims, 6 Drawing Sheets

FOREIGN PATENT DOCUMENTS

| | | |
|---|---|---|
| JP | 09-244984 A | 9/1997 |
| JP | 2001-198363 A | 7/2001 |
| JP | 2005-006913 A | 1/2005 |
| JP | 2005-034303 A | 2/2005 |
| TW | 575447 B | 2/2004 |
| WO | 96/25989 A2 | 8/1996 |
| WO | 99/32990 A2 | 7/1999 |

OTHER PUBLICATIONS

Taiwanese Search Report for Patent Application No. 095139299 dated Apr. 7, 2009 together w/partial translation.

Chinese Office Action issued in Chinese Application No. 200680047435.5 dated Jan. 17, 2011.

* cited by examiner

| OPERATION TIME INSTANT | GAME STATE UPDATE INFORMATION |
|---|---|
| ・・・ | GAME STATE UPDATE INFORMATION 1 |
| ・・・ | GAME STATE UPDATE INFORMATION 2 |
| ・・・ | GAME STATE UPDATE INFORMATION 3 |
| ・・・ | GAME STATE UPDATE INFORMATION 4 |

GAME MACHINE, GAME MACHINE CONTROL METHOD, INFORMATION STORAGE MEDIUM, AND NETWORK GAME SYSTEM

TECHNICAL FIELD

The present invention relates to a game machine, a game machine control method, an information storage medium, and a network game system.

BACKGROUND ART

There is known a game machine which is communicatively connected to a game server and display-outputs a game screen showing a content corresponding to a player's operation by exchanging data with the game server.
[Patent Document 1] Japanese Patent Laid-Open Publication No. 2005-34303

DISCLOSURE OF THE INVENTION

Problem to be Solved by the Invention

The above-mentioned game machine display-outputs a game screen showing a content corresponding to a player's operation by exchanging data with a game server via a communication network. Therefore, a time (response time) elapsing from the performance of an operation to the display-output of the game screen showing the content corresponding to the operation varies depending on the state of a communication network. In other words, the above-mentioned game machine has an unstable response time with respect to the operation, and may have the response time varying with respect to each operation. As a result, the player may feel stress.

The present invention has been made in view of the above-mentioned problem, and an object thereof is to provide: a game machine, a game machine control method, an information storage medium and a network game system which allow stabilization of a response time with respect to an operation and accordingly prevents the player from feeling stress due to variation of the response time with respect to the operation in a game machine which is communicatively connected to a game server and display-outputs a game screen showing a content corresponding to a player's operation by exchanging data with the game server.

Means for Solving the Problem

In order to solve the above-mentioned problem, according to the present invention, there is provided a game machine, which is communicatively connected to a game server and display-outputs a game screen showing a content corresponding to a player's operation by exchanging data with the game server. The game machine includes: reference time storage means for storing a reference time elapsing from performance of the player's operation to the display-output of the game screen showing the content corresponding to the operation; and waiting means for awaiting the display-output of the game screen showing the content corresponding to the player's operation based on the reference time stored in the reference time storage means.

Further, according to the present invention, there is provided a game machine control method for a game machine which is communicatively connected to a game server and display-outputs a game screen showing a content corresponding to a player's operation by exchanging data with the game server. The game machine control method includes: a waiting step of reading out a reference time elapsing from performance of the player's operation to the display-output of the game screen showing the content corresponding to the operation from reference time storage means configured to store the reference time, and awaiting for the display-output of the game screen showing the content corresponding to the player's operation based on the reference time.

A program according to the present invention causes a computer such as a home-use game machine, a portable game machine, an arcade game machine, a personal computer, a mobile phone, or a personal digital assistant (PDA) to function as a game machine which is communicatively connected to a game server and display-outputs a game screen showing a content corresponding to a player's operation by exchanging data with the game server. The program further causes the computer to function as: reference time storage means for storing a reference time elapsing from performance of the player's operation to the display-output of the game screen showing the content corresponding to the operation; and waiting means for awaiting for the display-output of the game screen showing the content corresponding to the player's operation based on the reference time stored in the reference time storage means.

Further, an information storage medium according to the present invention is a computer-readable information storage medium recorded with the above-mentioned program. Further, a program delivery device according to the present invention is a program delivery device that includes an information storage medium recorded with the above-mentioned program and reads out above-mentioned program from the information storage medium and delivers the above-mentioned program. Further, a program delivery method according to the present invention is a program delivery method, while using an information storage medium recorded with the above-mentioned program, for reading out the above-mentioned program from the information storage medium and delivering the above-mentioned program.

The present invention relates to a game machine which is communicatively connected to a game server and display-outputs a game screen showing a content corresponding to a player's operation by exchanging data with the game server. In the present invention, a reference time elapsing from the performance of the player's operation to the display-output of the game screen showing the content corresponding to the operation is stored. The display-output of the game screen showing the content corresponding to the player's operation is awaited based on the reference time. According to the present invention, the game machine, which is communicatively connected to the game server and display-outputs the game screen showing the content corresponding to the player's operation by exchanging data with the game server, allows stabilization of a response time with respect to an operation and accordingly prevention of the player from feeling stress due to variation of the response time with respect to the operation.

Further, according to an aspect of the present invention, the waiting means may include monitoring means for monitoring whether or not the reference time has elapsed from the performance of the player's operation, and may await the display-output of the game screen showing the content corresponding to the player's operation based on a monitor result as to whether or not the reference time has elapsed from the performance of the player's operation. Accordingly, for example, it is possible to await the display-output of the game screen showing the content corresponding to the player's.

operation until the reference time has elapsed from the performance of the player's operation, and the game screen showing the content corresponding to the operation can be display-outputted after the reference time has elapsed from the performance of the player's operation, which allows the stabilization of the response time with respect to the operation.

According to this aspect, the game machine may further include: means for transmitting a combination of operation information corresponding to the player's operation and operation time instant information indicating a time instant at which the player's operation is performed, to the game server; and means for receiving a combination of display-output basis information, which serves as a basis for the display-output of the game screen, and the operation time instant information, from the game server, and in the game machine, the monitoring means may monitor whether or not the reference time has elapsed from the operation time instant indicated by the operation time instant information received from the game server, and the waiting means may await the display-output of the game screen that is based on the display-output basis information received from the game server along with the operation time instant information based on the monitor result as to whether or not the reference time has elapsed from the operation time instant indicated by that operation time instant information received from the game server. Accordingly, in the game machine, which is communicatively connected to the game server and display-outputs the game screen showing the content corresponding to the player's operation by exchanging data with the game server, awaiting the display-output of the game screen showing the content corresponding to the player's operation until the reference time has elapsed from the performance of the player's operation, for example, can be realized with relatively simple processing.

Further, according to an aspect of the present invention, the game machine may further include: measuring means for measuring a time required for data exchange with the game server during a game; and reference time update means for updating the reference time stored in the reference time storage means based on a measurement result acquired by the measuring means. If an unnecessarily long time is set as the reference time, the response time with respect to the operation becomes unnecessarily long, which may adversely put the player under stress. In this respect, the above-mentioned configuration allows adjustment of the reference time depending on the variation of the communication state of the communication network during the game. For example, if the communication state of the communication network is satisfactory, and if the time required for data exchange with the game server is relatively short, it is possible to set the reference time to be relatively short as well.

Further, a network game system according to the present invention includes: a first game machine that includes first operation means, and display-outputs a game screen showing a content corresponding to an operation with respect to the first operation means; and a second game machine that includes second operation means, and display-outputs a game screen showing a content corresponding to an operation with respect to the second operation means by exchanging data with the first game machine via a communication network. The network game system further includes reference time storage means for storing a reference time elapsing from performance of the operation with respect to the operation means to the display-output of the game screen showing the content corresponding to the operation. The first game machine includes means for awaiting the display-output of the game screen showing the content corresponding to the operation with respect to the first operation means based on the reference time stored in the reference time storage means. The second game machine includes means for awaiting the display-output of the game screen showing the content corresponding to the operation with respect to the second operation means based on the reference time stored in the reference time storage means.

Further, a game machine according to the present invention is a game machine included in a network game system as a first game machine, the network game system including: reference time storage means for storing a reference time elapsing from performance of an operation with respect to operation means to the display-output of a game screen showing a content corresponding to the operation; the first game machine including first operation means, and display-outputting a game screen showing a content corresponding to an operation with respect to the first operation means; and a second game machine that includes second operation means, display-outputs a game screen showing a content corresponding to an operation with respect to the second operation means by exchanging data with the first game machine via a communication network, and includes means for awaiting the display-output of the game screen showing the content corresponding to the operation with respect to the second operation means based on the reference time stored in the reference time storage means. Also, the game machine includes: reference time acquiring means for acquiring the reference time stored in the reference time storage means; and means for awaiting the display-output of the game screen showing the content corresponding to the operation with respect to the first operation means based on the reference time acquired by the reference time acquiring means.

Further, a game machine control method according to the present invention is a control method for a game machine which is included in a network game system as a first game machine, the network game system including: reference time storage means for storing a reference time elapsing from performance of an operation with respect to operation means to the display-output of a game screen showing a content corresponding to the operation; the first game machine including first operation means, and display-outputting a game screen showing a content corresponding to an operation with respect to the first operation means; and a second game machine that includes second operation means, display-outputs a game screen showing a content corresponding to an operation with respect to the second operation means by exchanging data with the first game machine via a communication network, and includes means for awaiting the display-output of the game screen showing the content corresponding to the operation with respect to the second operation means based on the reference time stored in the reference time storage means. Also, the game machine control method includes: a reference time acquiring step of acquiring the reference time stored in the reference time storage means; and a step of awaiting the display-output of the game screen showing the content corresponding to the operation with respect to the first operation means based on the reference time acquired by the reference time acquiring step.

A program according to the present invention causes a computer such as a home-use game machine, a portable game machine, an arcade game machine, a personal computer, a mobile phone, or a personal digital assistant (PDA) to function as a first game machine included in a network game system, the network game system including: reference time storage means for storing a reference time elapsing from performance of an operation with respect to operation means to the display-output of a game screen showing a content corresponding to the operation; the first game machine including first operation means, and display-outputting a game screen showing a content corresponding to an operation with respect to the first operation means; and a second game machine that includes second operation means, display-outputs a game screen showing a content corresponding to an operation with respect to the second operation means by exchanging data with the first game machine via a communication network, and includes means for awaiting the display-output of the game screen showing the content corresponding to the operation with respect to the second operation means based on the reference time stored in the reference time storage means. The program further causes the computer to function as: reference time acquiring means for acquiring the reference time stored in the reference time storage means; and means for awaiting the display-output of the game screen showing the content corresponding to the operation with respect to the first operation means based on the reference time acquired by the reference time acquiring means.

Further, an information storage medium according to the present invention is a computer-readable information storage medium recorded with the above-mentioned program. Further, a program delivery device according to the present invention is a program delivery device that includes an information storage medium recorded with the above-mentioned program and reads out the above-mentioned program from the information storage medium and delivers the above-mentioned program. Further, a program delivery method according to the present invention is a program delivery method, while using an information storage medium recorded with the above-mentioned program, for reading out the above-mentioned program from the information storage medium and delivering the above-mentioned program.

The present invention relates to a network game system including first and second game machines. In the present invention, on the first game machine, a game screen showing a content corresponding to the operation with respect to first operation means is display-outputted. Further, on the second game machine, a game screen showing a content corresponding to the operation with respect to second operation means is display-outputted by exchanging data with the first game machine via a communication network. In the network game system, a reference time elapsing from the performance of the operation with respect to the operation means to the display-output of the game screen showing the content corresponding to the operation is stored. On the first game machine, the display-output of the game screen showing the content corresponding to the operation with respect to the first operation means is awaited based on the above-mentioned reference time. On the second game machine, the display-output of the game screen showing the content corresponding to the operation with respect to the second operation means is awaited based on the above-mentioned reference time. If the first and second game machines differ greatly from each other in the response time with respect to the operation, this causes unfairness between the players on the first and second game machines. In this respect, according to the present invention, the first and second game machines can be configured to have substantially the same response time with respect to the operation. In other words, according to the present invention, on "the second game machine that display-outputs the game screen showing the content corresponding to the operation with respect to the operation means by exchanging data with the first game machine via a communication network", it is possible to stabilize the response time with respect to the operation while ensuring fairness between the players on the first and second game machines.

BEST MODE FOR CARRYING OUT THE INVENTION

Hereinafter, detailed description will be made of an example of an embodiment of the present invention.

Figure 1:
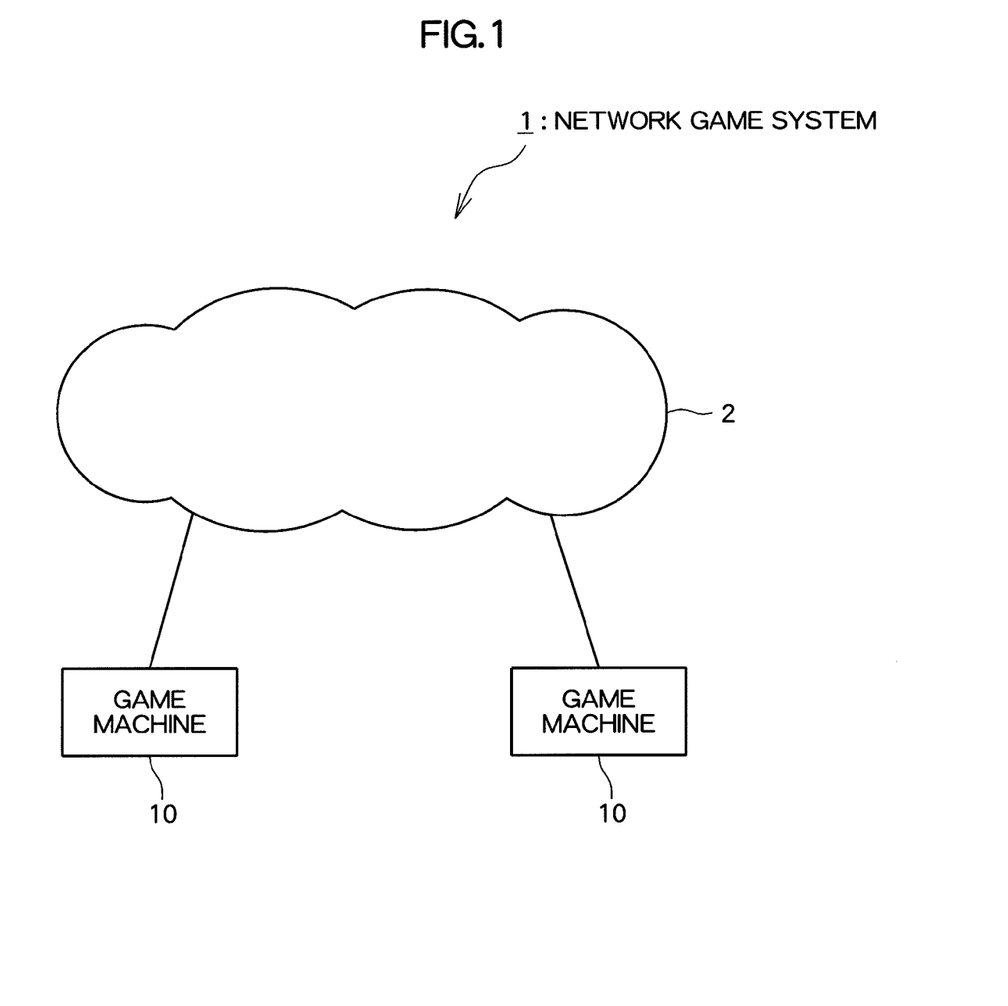
FIG. 1 is a diagram showing an entire configuration of a network game system including a game machine according to this embodiment.

FIG. 1 is a diagram showing an entire configuration of a network game system including a game machine according to the embodiment of the present invention. As shown in this figure, a network game system 1 includes a plurality of game machines 10. The plurality of game machines 10 are each connected to a communication network 2 such as the Internet, and can exchange data with each other.

The game machine 10 is a computer system including a microprocessor, a main memory, a hard disk storage device, a disk reader, a communication interface, a timer unit, an operation unit, an image processing unit, and a monitor. Note that examples of the operation unit include a game controller and a mouse. The disk reader represents a device for reading a storage content of an optical disk (information storage medium) such as a DVD-ROM. The communication interface represents an interface for connecting the game machine 10 to the communication network 2. The image processing unit includes a VRAM, and draws a game screen in the VRAM based on image data transmitted from the microprocessor. The image processing unit then converts its content into a video signal and outputs the video signal to the monitor at a predetermined timing. The game machine 10 is constituted by, for example, a conventionally known machine such as a home-use game machine, a portable game machine, a personal digital assistant, a mobile phone set, or a personal computer.

The network game system 1 having the above-mentioned configuration provides a competitive soccer game to be played between players related to the two game machines 10. In the main memory of each of the game machines 10, a shared game space in which soccer player characters of both teams, a ball character, and the like are located is built. A game screen showing a situation of the shared game space is displayed on the monitor of each of the game machines 10.

In the network game system 1, the game machines 10 each have a server function and a client function. In the network game system 1, the game machines 10 each operate as a client while any one thereof also operates as a server, thereby realizing the above-mentioned competitive soccer game. Note that in the following description, the game machine 10 (first game machine) operating as a server and a client will be described as a server-client machine (game server). Meanwhile, the game machine 10 (second game machine) operating as a client but not as a server will be described as a client-dedicated machine.

The server-client machine integrally manages the situation of the game space. The state of the game space is updated based on an operation performed by the server-client machine and the client-dedicated machine. If the operation is performed by the server-client machine, the state of the game space is updated based on the content of the operation, and a game screen showing the state of the game space after the update is displayed on the monitor of the server-client machine. Meanwhile, if the operation is performed by the client-dedicated machine, data related to the operation is transmitted to the server-client machine via the communication network 2. In this case, in the server-client machine, the state of the game space is updated based on the data transmitted from the client-dedicated machine, and data related to the state of the game space after the update is returned to the client-dedicated machine. Then, based on the data returned from the server-client machine, the game screen showing the state of the game space after the update is displayed on the monitor of the client-dedicated machine.

In the above-mentioned network game system 1, in the case where the player performs an operation, the client-dedicated machine exchanges data with the server-client machine via the communication network 2 to thereby display-outputs the game screen showing the content corresponding to the operation. Therefore, in the client-dedicated machine, a time (response time) elapsing from the performance of an operation to the display-output of the game screen showing the content corresponding to the operation may vary under the influence of the communication state of the communication network 2. The client-dedicated machine may cause the player to feel stress from such a variation. Hereinafter, description will be given of a technique for stabilizing the response time with respect to the operation in the client-dedicated machine, and resultantly avoiding the player from feeling stress due to the variation of the response time with respect to the operation.

Figure 2:
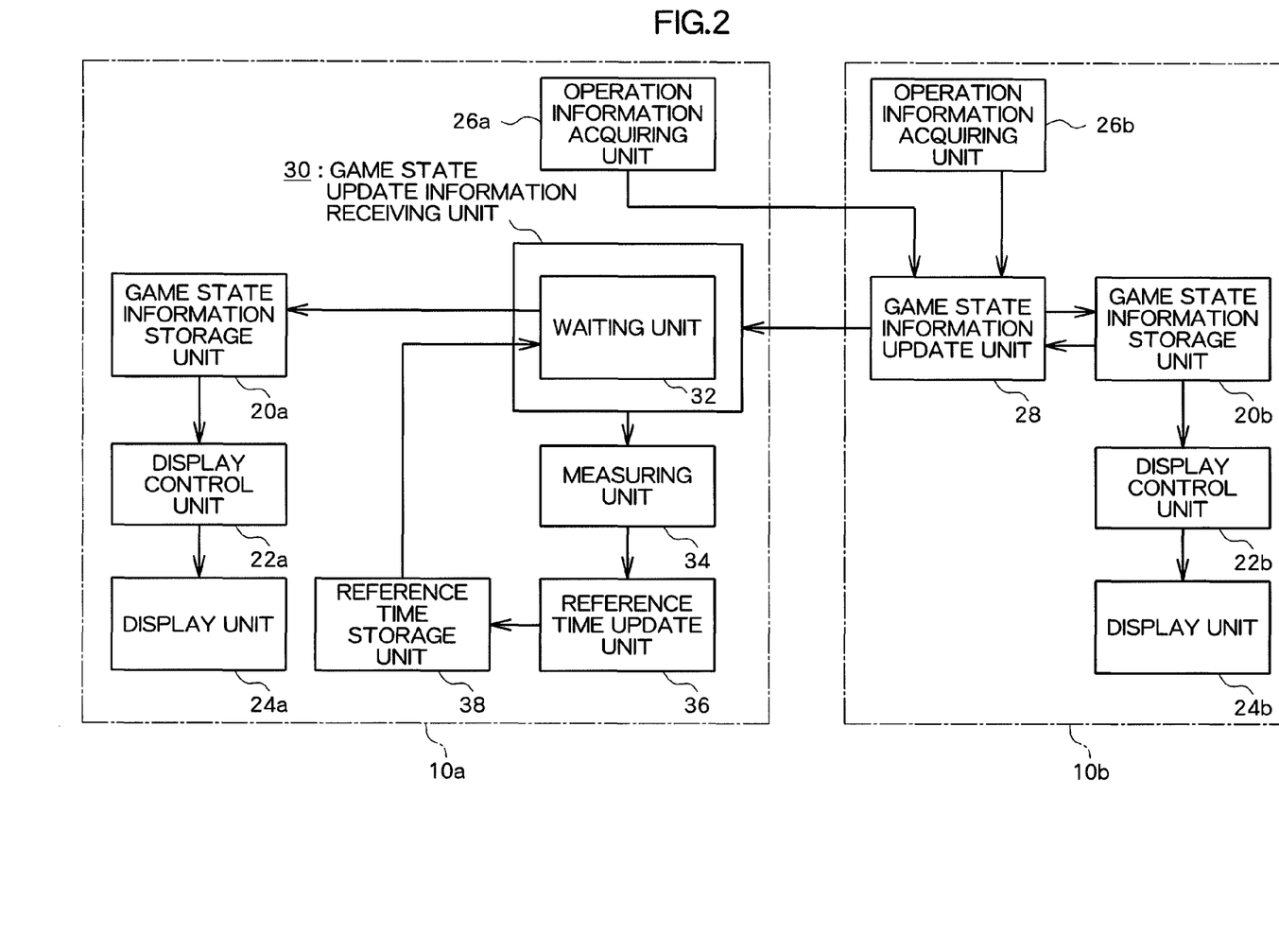
FIG. 2 is a functional block diagram of the game machine according to this embodiment.

FIG. 2 is a functional block diagram showing functions realized in each game machine 10 which are related to the present invention. In this figure, a game machine 10a represents a client-dedicated machine, and a game machine 10b represents a server-client machine. As shown in the figure, the client-dedicated machine includes a game state information storage unit 20a, a display control unit 22a, a display unit 24a, an operation information acquiring unit 26a, a game state update information receiving unit 30, a measuring unit 34, a reference information update unit 36, and a reference time storage unit 38. Meanwhile, the server-client machine includes a game state information storage unit 20b, a display control unit 22b, a display unit 24b, an operation information acquiring unit 26b, and a game state information update unit 28. Those functions are realized by a game program being executed by the game machines 10a and 10b, the game program being supplied via an information storage medium such as a DVD-ROM or via the communication network 2 such as the Internet.

[Game State Information Storage Unit]

The game state information storage unit 20a is realized mainly by the main memory of the game machine 10a, while the game state information storage unit 20b is realized mainly by the main memory of the game machine 10b. The game state information storage units 20a and 20b each store game state information that indicates the situation of a game. In a case of this embodiment, the game state information represents information indicating, for example, states (such as a position, a posture, a moving direction, a moving speed, and an action type such as "dribble", "pass", or "shot") of each of the soccer player characters and states (such as a position, a moving direction, and a moving speed) of the ball character, the characters being located in the game space. The game state information also represents information indicating, for example, states of a match such as scores of both teams and an elapsed time of the match.

[Operation Information Acquiring Unit]

The operation information acquiring unit 26a is realized mainly by the operation unit of the game machine 10a, while the operation information acquiring unit 26b is realized mainly by the operation unit of the game machine 10b. The operation information acquiring units 26a and 26b acquire operation information corresponding to the content of the player's operation based on an operation signal inputted from the operation unit.

Herein, the operation information represents information indicating, for example, the content of the player's operation judged based on an operation signal inputted from the operation unit. The operation information may represent information indicating, for example, the operation signal inputted from the operation unit itself. The operation information may represent information indicating, for example, an action instruction content issued to a player character to be operated. The action instruction content represents, for example, a dribble, a pass, or a shot, and is judged based on the operation signal inputted from the operation unit. As described later, the operation information is regarded as a basis of an update of the game state information.

The operation information acquired by the operation information acquiring units 26a and 26b is supplied to the game state information update unit 28 of the server-client machine. Herein, the operation information acquired by the operation information acquiring unit 26a is supplied to the game state information update unit 28 via the communication network 2 along with operation time instant information indicating a time instant at which the operation information is acquired (hereinafter, referred to as "operation time instant"). Note that in the case of this embodiment, the operation time instant is represented in $\frac{1}{60}$-second units.

[Game State Information Update Unit]

The game state information update unit 28 is realized mainly by the microprocessor and communication interface of the game machine 10b. The game state information update unit 28 updates a storage content of the game state information storage unit 20b based on the operation information supplied from the operation information acquiring units 26a and 26b.

If the game state information update unit 28 receives the operation information supplied from the operation information acquiring unit 26b, the game state information update unit 28 updates the game state information stored in the game state information storage unit 20b based on the operation information. If the game state information update unit 28 receives the operation information supplied from the operation information acquiring unit 26a, the game state information update unit 28 updates the game state information stored in the game state information storage unit 20b based on the operation information, and then returns to the client-dedicated machine a combination of game state update information (display-output basis information) and the operation time instant information received along with the operation information from the operation information acquiring unit 26a. Herein, the game state update information may be any information that serves to reflect an update content of the game state information stored in the game state information storage unit 20b in the game state information stored in the game state information storage unit 20a. In the case of this embodiment, the game state update information corresponds to the game state information after the update. Note that instead of the game state information after the update, for example, information indicating a difference from the previous update (previous update based on the operation information transmitted from the operation information acquiring unit 26a) may be transmitted.

[Game State Update Information Receiving Unit]

The game state update information receiving unit 30 is realized mainly by the microprocessor, main memory, and communication interface of the game machine 10a. The game state update information receiving unit 30 receives the game state update information and the operation time instant information that are transmitted from the game state information update unit 28. The game state update information receiving unit 30 includes a waiting unit 32. The waiting unit 32 will be described later.

[Measuring Unit]

The measuring unit 34 is realized mainly by the microprocessor, main memory, and timer unit of the game machine 10a. The measuring unit 34 measures a time required for data exchange with the server-client machine during the game. In the case of this embodiment, the measuring unit 34 acquires the operation time instant that information is received along with the game state update information by the game state update information receiving unit 30. The measuring unit 34 then calculates a time (response time) corresponding to a difference between the current time instant and the operation time instant indicated by the operation time instant information. The response time indicates a time elapsing from the time when the operation is performed on the client-dedicated machine until the client-dedicated machine receives the game state update information in which the content of the operation has been reflected. As described above, in the case of this embodiment, a measurement is repeatedly executed by the measuring unit 34. Note that in the case of this embodiment, the response time is represented in 1/60-second units.

In the case of this embodiment, the measuring unit 34 stores response time history data (Tr1, Tr2, . . . , Trn) indicating a history of measurement results. The number of measurement results held in the response time history data is N at maximum. If a new measurement result is acquired, the measuring unit 34 adds the measurement result to the response time history data. Note that if a new measurement result is acquired in a state where N measurement results are already held in the response time history data, the measuring unit 34 deletes the oldest measurement result, and then executes the addition of the newly acquired measurement result. The response time history data is referenced by the reference time update unit 36. Detailed description thereof will be given later.

[Reference Time Storage Unit]

The reference time storage unit 38 is realized mainly by the main memory of the game machine 10a. The reference time storage unit 38 stores a reference time elapsing from the performance of the player's operation to the display-output of the game screen showing the content corresponding to the operation. Note that in the case of this embodiment, the reference time is represented in 1/60-second units.

[Reference Time Update Unit]

The reference time update unit 36 is realized mainly by the microprocessor of the game machine 10a. The reference time update unit 36 updates the reference time stored in the reference time storage unit 38 based on the measurement results acquired by the measuring unit 34. For example, the reference time update unit 36 acquires a statistical amount of the measurement results acquired by the measuring unit 34, and updates the reference time stored in the reference time storage unit 38 based on the statistical amount.

In the case of this embodiment, the reference time update unit 36 calculates the statistical amount of response times by executing predetermined statistical processing based on the response time history data stored in the measuring unit 34. To be specific, the reference time update unit 36 acquires a maximum value of the response time based on the response time history data stored in the measuring unit 34. The reference time update unit 36 then updates the reference time stored in the reference time storage unit 38 to a time obtained by multiplying the maximum value of the response time by a predetermined coefficient α (0<α≦1; e.g., 0.7). Note that the reference time update unit 36 may acquire a mean value of the response time based on the response time history data stored in the measuring unit 34, and update the reference time stored in the reference time storage unit 38 to the mean value of the response time.

[Waiting Unit]

Figure 3:
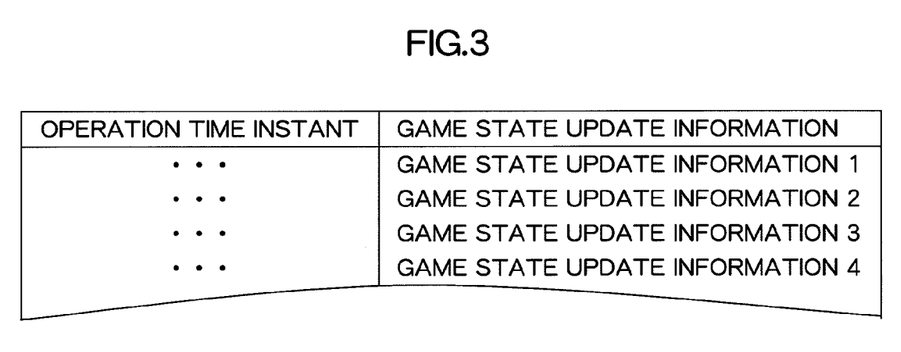
FIG. 3 is a diagram showing an example of queue data for game state update.

The waiting unit 32 awaits the display-output of the game screen showing the content corresponding to the player's operation based on the reference time stored in the reference time storage unit 38. In the case of this embodiment, the waiting unit 32 stores such queue data for game state information update as shown in FIG. 3. Stored in the queue data for game state information update is a combination of the game state update information and the operation time instant information (operation time instant indicated by the operation time instant information) that have been received by the game state update information receiving unit 30. If the elapsed time from the operation time instant associated with the game state update information reaches or exceeds the reference time stored in the reference time storage unit 38, the waiting unit 32 updates the game state information stored in the game state information storage unit 20a based on the corresponding game state update information.

[Display Control Unit and Display Unit]

The display control unit 22a is realized mainly by the microprocessor and image processing unit of the game machine 10a, while the display control unit 22b is realized mainly by the microprocessor and image processing unit of the game machine 10b. Further, the display unit 24a is realized mainly by the monitor of the game machine 10a, while the display unit 24b is realized mainly by the monitor of the game machine 10b. The display control unit 22a generates a game screen based on the storage content of the game state information storage unit 20a, and causes the display unit 24a to display the game screen. The display control unit 22b similarly generates a game screen based on the storage content of the game state information storage unit 20b, and causes the display unit 24b to display the game screen.

Next, description will be given of processing executed on the client-dedicated machine (game machine 10a) and the server-client machine (game machine 10b).

Figure 4:
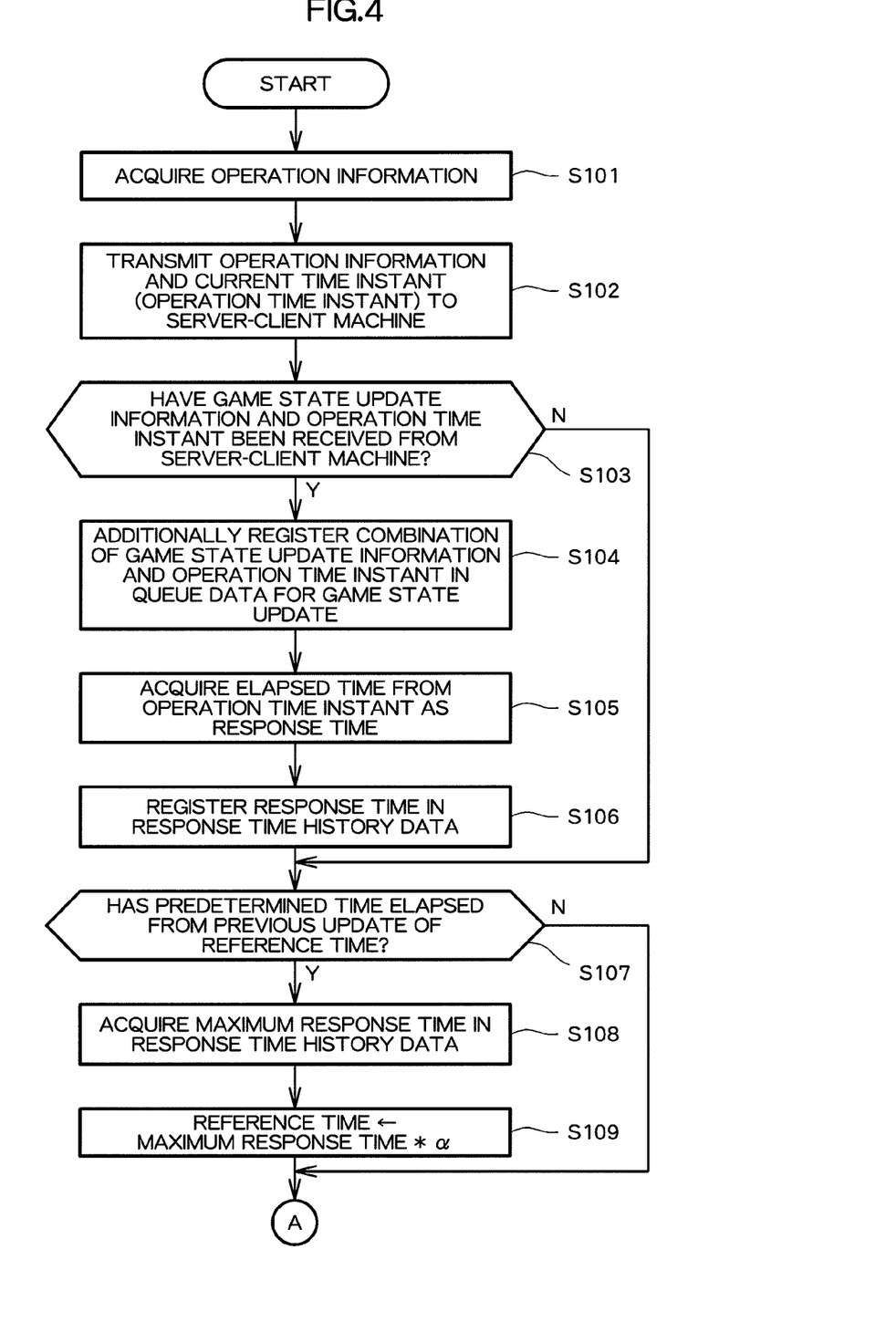
FIG. 4 is a flowchart showing processing executed by a client-dedicated machine.
Figure 5:
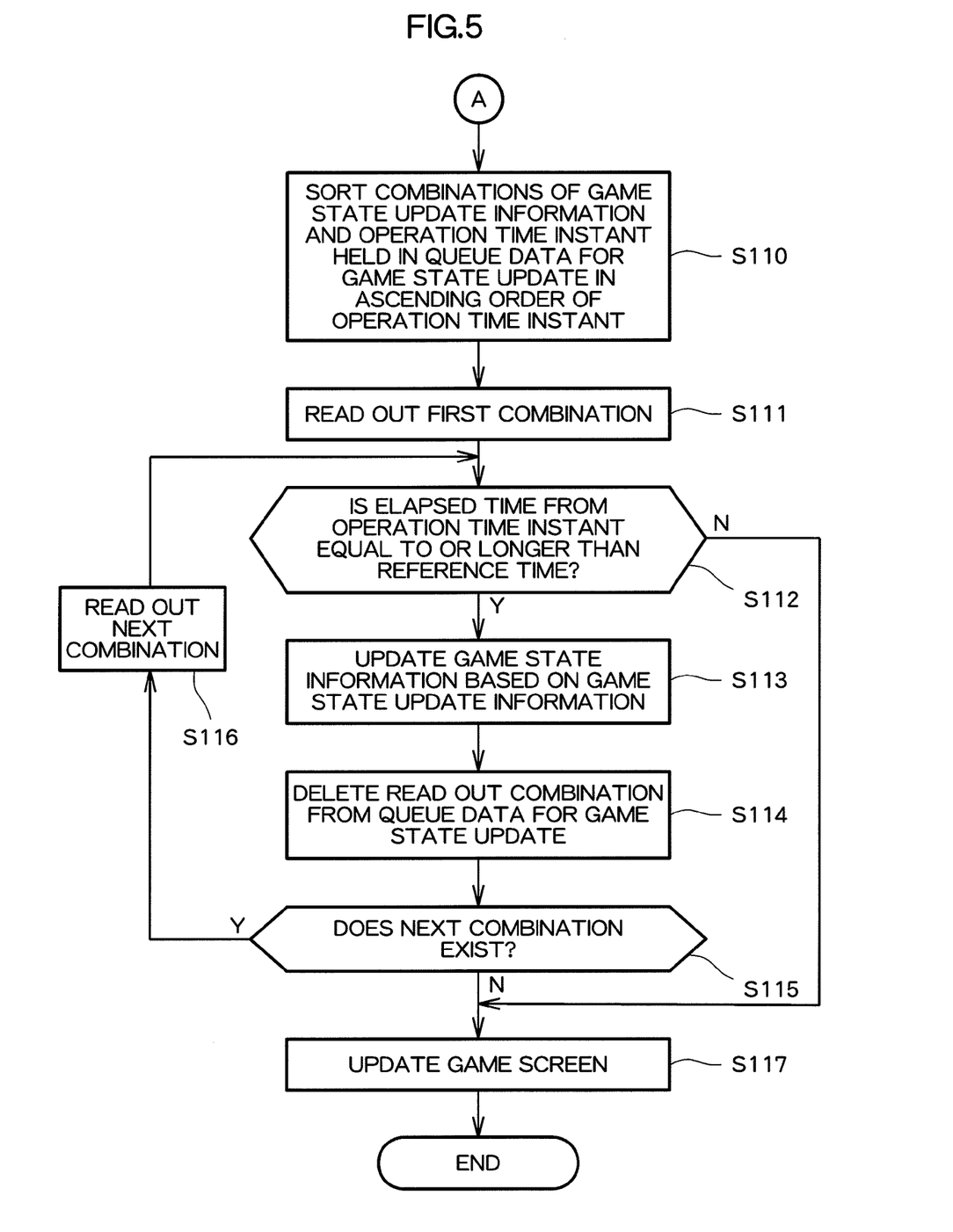
FIG. 5 is another flowchart showing the processing executed by the client-dedicated machine.

FIGS. 4 and 5 are flowcharts mainly showing game processing which is executed on the client-dedicated machine (game machine 10a) every predetermined time (1/60$^{th}$ of a second in the case of this embodiment) and which is related to the present invention. Note that the game processing is realized by a game program being executed by the client-dedicated machine, the game program being read out from the information storage medium such as a DVD-ROM, or the game program being supplied via the communication network 2.

As shown in FIG. 4, on the client-dedicated machine, operation information is first acquired through the operation information acquiring unit 26a (S101). Subsequently, the operation information and the current time instant (operation time instant) are transmitted to the game state information update unit 28 of the server-client machine (S102).

Figure 6:
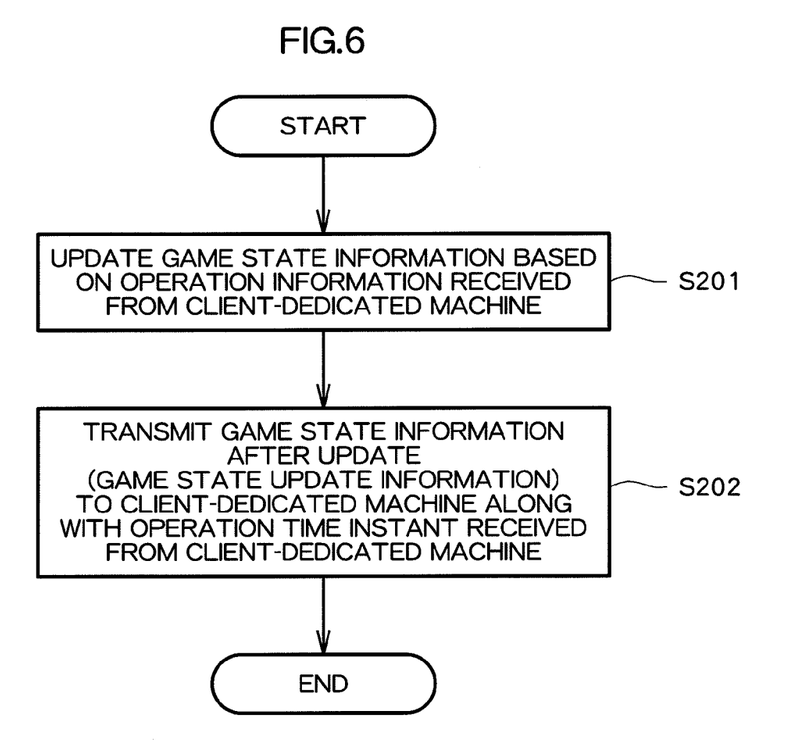
FIG. 6 is a flowchart showing processing executed by a server-client machine.

In the case where the server-client machine receives the operation information and operation time instant transmitted from the client-dedicated machine, for example, such processing as shown in FIG. 6 is executed by the game state information update unit 28. Note that the processing shown in the figure is realized by a game program being executed by the server-client machine, the game program being read out from the information storage medium such as a DVD-ROM, or the game program being supplied via the communication network 2.

As shown in FIG. 6, on the server-client machine, in the case where the operation information and operation time instant that have been transmitted from the client-dedicated machine are received, the game state information stored in the game state information storage unit 20b is updated based on the operation information (S201). After that, the game state information (game state information after the update) stored in the game state information storage unit 20b is returned to the client-dedicated machine as the game state update information (S202). At the same time, the operation time instant received from the client-dedicated machine is also returned.

Note that the processing shown in FIG. 6 is executed as a part of a game processing executed on the server-client machine every predetermined time ($\frac{1}{60}^{th}$ of a second in the case of this embodiment). In the game processing executed on the server-client machine, the operation information is acquired through the operation information acquiring unit 26b, and the game state information stored in the game state information storage unit 20b is updated based on the operation information. Accordingly, the operation performed on the server-client machine is also reflected on the game state update information returned to the client-dedicated machine. In addition, in the game processing executed on the server-client machine, a game screen is generated based on the game state information stored in the game state information storage unit 20b, and the game screen is display-outputted onto the display unit 24b.

After the processing of Step S102 has been executed, on the client-dedicated machine, it is judged whether or not the game state update information and operation time instant transmitted from the server-client machine has been received (S103). If the game state update information and operation time instant have been received, the combination is additionally registered in the queue data for game state update (S104). Further, the elapsed time from the received operation time instant to the current time is acquired as a response time (S105). Then, the response time is additionally registered in the response time history data (S106).

After the processing of Steps S104 to S106 has been executed, or if the game state update information and operation time instant have not been received from the server-client machine (N in S103), it is judged whether or not a predetermined time (for example, 1 minute) has elapsed from the previous update of the reference time stored in the reference time storage unit 38 (S107). If the predetermined time has elapsed from the previous update, the maximum value among the response times stored in the response time history data is acquired (S108). Then, the reference time stored in the reference time storage unit 38 is updated into the time obtained by multiplying the maximum response time acquired in Step 108 by the predetermined coefficient $\alpha$ ($0<\alpha\leq 1$; e.g., 0.7) (S109).

After the processing of Steps S108 and S109 has been executed, or if the predetermined time has not elapsed from the previous update of the reference time (N in S107), the combinations of the game state update information and operation time instant that are held in the queue data for game state update are sorted in ascending order of the operation time instant (S110). Then, the first combination is read out (S111).

In the case where the combination of the game state update information and the operation time instant is read out from the queue data for game state update, it is judged whether or not the elapsed time from the read out operation time instant to the current time is equal to or longer than the reference time stored in the reference time storage unit 38 (S112). If the elapsed time from the read out operation time instant to the current time is equal to or greater than the reference time, the game state information stored in the game state information storage unit 20a is updated based on the read out game state update information (S113). In this case, the combination is deleted from the queue data for game state update (S114).

After that, it is judged whether or not the next combination of the game state update information and the operation time instant exists in the queue data for game state update (S115). If the next combination exists, the combination is read out from the queue data for game state update (S116), and the processing of Steps S112 to S115 is executed.

On the other hand, if it is judged that the next combination does not exist in the queue data for game state update, the game screen displayed on the monitor of the client-dedicated machine is updated based on the game state information stored in the game state information storage unit 20a (S117). In other words, the game screen is generated in the VRAM based on the game state information stored in the game state information storage unit 20a, and the game screen generated in the VRAM is outputted to the monitor at a predetermined timing.

Note that in Step S112, if the elapsed time from the operation time instant read out from the queue data for game state information update to the current time is less than the reference time (N in S112), the update of the game state information based on the game state update information read out in Step S111 is suppressed, and the game screen displayed on the monitor of the client-dedicated machine is updated based on the game state information stored in the game state information storage unit 20a at the time point (S117). Accordingly, the client-dedicated machine is configured such that even if the game state update information is received from the server-client machine, and even if the storage content of the game state information storage unit 20a can be updated based on the game state update information, the update based on the game state update information is prevented from being executed deliberately until the elapsed time from the operation time instant corresponding to the game state update information becomes equal to or greater than the reference time. In other words, the client-dedicated machine is configured such that even if the response time with respect to the operation can be shortened, the response time is prolonged to the reference time. As a result, the client-dedicated machine achieves the stabilized response time.

As described above, on the client-dedicated machine (game machine 10a) of the network game system 1, even if the game state update information is received from the server-client machine (game machine 10b), the storage content of the game state information storage unit 20a is not immediately updated based on the game state update information. In other words, on the client-dedicated machine, if the game state update information is received from the server-client machine, the storage content of the game state information storage unit 20a is updated based on the game state update information only after the elapsed time from the operation time instant associated with the game state update information reaches the reference time. As a result, on the client-dedicated machine, the game screen showing the content corresponding to the player's operation is display-outputted in the case where the elapsed time from the performance of the operation reaches the reference time. According to the client-dedicated machine of the network game system 1, it is possible to achieve stabilization of a time (response time) from the time when the operation is performed on the client-dedicated machine until the game screen showing the content corresponding to the operation is display-outputted. As a result, according to the client-dedicated machine of the network game system 1, it is possible to spare the player from feeling stress due to the variation of the response time.

Further, on the client-dedicated machine (game machine 10a) of the network game system 1, an actual time (response time), which is required after the operation information is acquired on the client-dedicated machine until the game state update information based on the operation information is received, is measured. Then, the reference time stored in the reference time storage unit 38 is updated based on the measurement result. According to the client-dedicated machine of the network game system 1, it is possible to adjust the reference time stored in the reference time storage unit 38 depending on the variation of the communication state of the communication network 2 during the game.

Note that the present invention is not limited to the embodiment described above.

For example, the waiting unit 32 for awaiting the display-output of the game screen showing the content corresponding to the player's operation based on the reference time stored in the reference time storage unit 38 may be included in the display control unit 22a.

Figure 7:
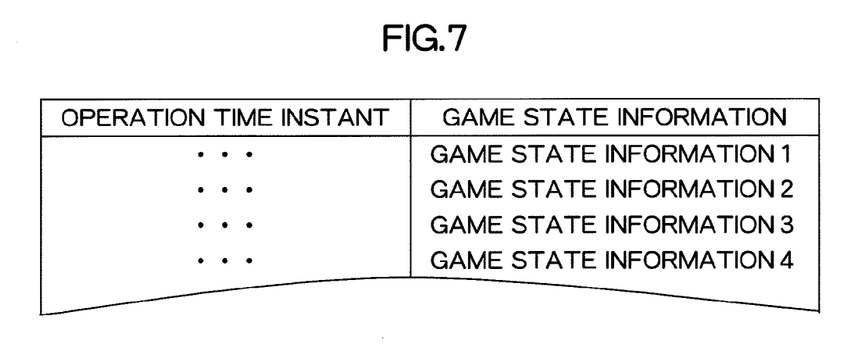
FIG. 7 is a diagram showing an example of queue data for display-output.

In this case, for example, such queue data for display-output as shown in FIG. 7, which is obtained by associating the operation time instant and the game state information, is stored in the game state information storage unit 20a, instead of the queue data for game state update (FIG. 3), which is obtained by associating the operation time instant and the game state update information, being stored in the game state update information receiving unit 30 (waiting unit 32).

Further, if the game state update information is received, the game state update information receiving unit 30 of this case reads out the game state information associated with the operation time instant closest to the current time from among the game state information in the queue data for display-output, and updates the game state information based on the game state update information to thereby generate new game state information. Then, the game state update information receiving unit 30 adds the combination of the operation time instant received along with the game state update information and the newly generated game state information to the queue data for display-output.

Further, the display control unit 22a (waiting unit 32) of this case judges whether or not the elapsed time from the operation time instant becomes equal to or greater than the reference time for each operation time instant in the queue data for display-output. If it is judged that the elapsed time from the operation time instant becomes equal to or greater than the reference time, the game screen is generated based on the game state information associated with the operation time instant, and is display-outputted onto the display unit 24a.

Even in the above-mentioned configuration, on the client-dedicated machine, the game screen showing the content corresponding to the player's operation is display-outputted in the case where the elapsed time from the performance of the operation reaches the reference time.

Further, for example, the measuring unit 34 may acquire a time required for data exchange with the server-client machine by exchanging predetermined response request data and response data with the server-client machine during the game.

For example, the measuring unit 34 of this case transmits a first response request data to the server-client machine. Herein, the first response request data contains a transmission time instant, and has a data size M1 (for example, 1 Kbyte). Further, upon receipt of the first response request data, the server-client machine of this case returns a first response data. Herein, the first response data contains a transmission time instant contained in the first response request data, and has a data size M2 (for example, 256 bytes). Upon receipt of the first response data, the measuring unit 34 calculates an elapsed time T1 from the transmission time instant contained in the first response data.

Subsequently, the measuring unit 34 transmits a second response request data to the server-client machine. Upon receipt of the second response request data, the server-client machine returns a second response data. Herein, the second response request data contains a transmission time instant. Further, the second response data contains a transmission time instant contained in the second response request data. Further, the second response request data and the second response data have such a relationship that a data size ratio of the second response request data to the second response data differs from a data size ratio of the first response request data to the first response data. Herein, the second response request data is set to be data having the same data size as the first response data (data having the data size M2), and the second response data is set to be data having the same data size as the first response request data (data having the data size M1). In the case of reception of the second response data, the measuring unit 34 calculates an elapsed time T2 from the transmission time instant contained in the second response data.

Subsequently, the measuring unit 34 solves the following simultaneous equations (1) and (2) to thereby calculate a communication speed (uplink communication speed) Vu in a case where data is transmitted from the client-dedicated machine to the server-client machine and a communication speed (downlink communication speed) Vd in a case where data is transmitted from the server-client machine to the client-dedicated machine. Note that in this specification, "*" represents a multiplication operator.

$$(M1*Vu)+(M2*Vd)=T1 \quad (1)$$

$$(M2*Vu)+(M1*Vd)=T2 \quad (2)$$

Then, the measuring unit 34 calculates the estimated response time (Tr) by the following calculation equation (3), and supplies the estimated response time to the reference time update unit 36. Note that in the calculation equation (3), Mu represents a mean data size of data transmitted from the client-dedicated machine to the server-client machine. In other words, Mu represents the mean data size of the data indicating the combination of the operation information and the operation time instant information. In addition, Md represents a mean data size of data transmitted from the server-client machine to the client-dedicated machine. In other words, Md represents the mean data size of the data indicating the combination of the game state update information and the operation time instant information.

$$Tr=(Mu*Vu)+(Md*Vd) \quad (3)$$

Even in the above-mentioned configuration, the variation of the communication state of the communication network 2 during the game is reflected in the reference time stored in the reference time storage unit 38.

Further, for example, the reference time stored in the reference time storage unit 38 may be supplied to the server-client machine via the communication network 2, and the server-client machine may also hold the reference time. The server-client machine may also await the display-output of the game screen showing the content corresponding to the player's operation based on the reference time.

For example, the server-client machine of this case stores the operation information acquired through the operation information acquiring unit 26b in association with the time instant (operation time instant) at which the operation information is acquired. If the elapsed time from the operation time instant associated with the operation information reaches the reference time, the server-client machine updates the game state information stored in the game state information storage unit 20b based on the operation information.

Thus, even on the server-client machine, the game screen showing the content corresponding to the player's operation is display-outputted when the elapsed time from the performance of the operation reaches the reference time. As a result, the time taken until the operation performed on the server-client machine is reflected on the game screen of the server-client machine becomes substantially equal to the time taken until the operation performed on the client-dedicated machine is reflected on the game screen of the client-dedicated machine, making it possible to ensure fairness between the player who plays on the server-client machine and the player who plays on the client-dedicated machine.

Further, for example, instead of the system described above in which one of the two game machines 10 operates as the server-client machine while the other operates as the client-dedicated machine, the network game system 1 may include a game server in addition to the two game machines 10, and both of the game machines 10 may operate as the client-dedicated machines.

Further, for example, the present invention is not necessarily applied to the network game system 1 that provides the soccer game. The present invention can also be applied to network game systems that provide other sports games and other types of game (such as a fighting game).

The invention claimed is:

1. A game machine, which is communicatively connected to a game server and display-outputs a game screen showing a content corresponding to a player's operation by exchanging data with the game server, comprising:
    a reference time storage unit that stores a reference time elapsing from completion of performance of the player's operation to the display-output of the game screen showing the content corresponding to the operation, the reference time being indicative of a time required for data exchange with the server during a game;
    a waiting unit that delays the display-output of the game screen showing the content corresponding to the player's operation based on the reference time stored in the reference time storage unit; and
    a reference time update unit that updates, based on a maximum historical response time, the reference time as stored based on an acquired measurement result.

2. A game machine according to claim 1, wherein the waiting unit monitors whether the reference time has elapsed from the performance of the player's operation, and delays the display-output of the game screen showing the content corresponding to the player's operation based on a monitor result as to whether the reference time has elapsed from the performance of the player's operation.

3. A game machine according to claim 2, further comprising:
    an operation information acquiring unit that transmits a combination of operation information corresponding to the player's operation and operation time instant information indicating a time instant at which the player's operation has been performed, to the game server; and
    a game state update information receiving unit that receives combination of display-output basis information, which serves as a basis for the display-output of the game screen, and the operation time instant information, from the game server, wherein:
    the waiting unit monitors whether the reference time has elapsed from the operation time instant indicated by the operation time instant information received from the game server; and
    the waiting unit delays the display-output of the game screen that is based on the display-output basis information received from the game server along with the operation time instant information based on the monitor result as to whether the reference time has elapsed from the operation time instant indicated by that operation time instant information received from the game server.

4. A game machine control method for a game machine which is communicatively connected to a game server and display-outputs a game screen showing a content corresponding to a player's operation by exchanging data with the game server, the game machine comprising a processor that performs:
    reading out a reference time elapsing from completion of performance of the player's operation to the display-output of the game screen showing the content corresponding to the operation from a reference time storage unit configured to store the reference time, the reference time being indicative of a time required for data exchange;
    delaying the display-output of the game screen showing the content corresponding to the player's operation based on the reference time; and
    updating, based on a maximum historical response time, the reference time as stored based on an acquired measurement result.

5. A non-transitory computer-readable information storage medium recorded with a program for causing a computer to function as a game machine which is communicatively connected to a game server and display-outputs a game screen showing a content corresponding to a player's operation by exchanging data with the game server, the program further causing the computer to function as:
    a reference time storage unit for storing a reference time elapsing from completion of performance of the player's operation to the display-output of the game screen showing the content corresponding to the operation, the reference time being indicative of a time required for data exchange with the server during a game;
    a waiting unit that delays the display-output of the game screen showing the content corresponding to the player's operation based on the reference time stored in the reference time storage unit; and
    a reference time update unit that updates, based on a maximum historical response time, the reference time as stored based on an acquired measurement result.

6. A network game system, comprising:
    a first game machine that includes first operation information acquiring unit, and display-outputs a game screen showing a content corresponding to an operation with respect to the first operation information acquiring unit; and a second game machine that includes second operation information acquiring unit, and display-outputs a game screen showing a content corresponding to an operation with respect to the second operation information acquiring unit by exchanging data with the first game machine, wherein:

the network game system further comprises, first and second reference time storage units that each store a reference time elapsing from completion of performance of the operation with respect to the first and second operation information acquiring units, respectively, to the display-output of the game screen showing the content corresponding to the operation, the reference time being indicative of a time required for data exchange;

the first game machine includes a first waiting unit that delays the display-output of the game screen showing the content corresponding to the operation with respect to the first operation information acquiring unit based on the reference time stored in the reference time storage unit;

the second game machine includes a second waiting unit that delays the display-output of the game screen showing the content corresponding to the operation with respect to the second operation information acquiring unit based on the reference time stored in the reference time storage unit; and at least one of the first game machine and the second game machine comprises a reference time update unit that updates, based on a maximum historical response time, the reference time as stored based on an acquired measurement result.

7. A game machine, which is included in a network game system as a first game machine, the network game system including:

a reference time storage unit that stores a reference time elapsing from completion of performance of an operation with respect to display-output of a game screen showing a content corresponding to the operation;

the first game machine that includes a first operation information acquiring unit, and display-outputs a game screen showing a content corresponding to an operation with respect to the first operation information acquiring unit, the reference time being indicative of a time required for data exchange; and a second game machine that includes a second operation information acquiring unit, display-outputs a game screen showing a content corresponding to an operation with respect to the second operation information acquiring unit by exchanging data with the first game machine, and includes a second waiting unit that delays the display-output of the game screen showing the content corresponding to the operation with respect to the second operation information acquiring unit based on the reference time stored in the reference time storage unit, the game machine comprising:

a first waiting unit that acquires the reference time stored in the reference time storage unit, and delays the display-output of the game screen showing the content corresponding to the operation with respect to the first operation information acquiring unit based on the reference time acquired by the reference time acquiring unit; and a reference time update unit that updates, based on a maximum historical response time, the reference time as stored based on an acquired measurement result.

8. A game machine control method for a game machine which is included in a network game system as a first game machine, the network game system including:

a reference time storage unit that stores a reference time elapsing from completion of performance of an operation with respect to display-output of a game screen showing a content corresponding to the operation, the reference time being indicative of a time required for data exchange;

the first game machine including a first operation information acquiring unit, and display-outputting a game screen showing a content corresponding to an operation with respect to the first operation information acquiring unit; and a second game machine that includes a second operation information acquiring unit, display-outputs a game screen showing a content corresponding to an operation with respect to the second operation information acquiring unit by exchanging data with the first game machine via a communication network, and includes a waiting unit that delays the display-output of the game screen showing the content corresponding to the operation with respect to the second operation information acquiring unit based on the reference time stored in the reference time storage unit, the game machine comprising a processor that performs:

acquiring the reference time stored in the reference time storage unit;

delaying the display-output of the game screen showing the content corresponding to the operation with respect to the first operation information acquiring unit-based on the acquired reference time; and updating, based on a maximum historical response time, the reference time as stored based on an acquired measurement result.

9. A non-transitory computer-readable information storage medium recorded with a program for causing a computer to function as a first game machine included in a network game system, the network game system including:

reference time storage unit that stores a reference time elapsing from completion of performance of an operation with respect to the display-output of a game screen showing a content corresponding to the operation, the reference time being indicative of a time required for data exchange;

the first game machine including a first operation information acquiring unit, and display-outputting a game screen showing a content corresponding to an operation with respect to the first operation information acquiring unit; and a second game machine that includes a second operation information acquiring unit, display-outputs a game screen showing a content corresponding to an operation with respect to the second operation information acquiring unit by exchanging data with the first game machine via a communication network, and includes a waiting unit that delays the display-output of the game screen showing the content corresponding to the operation with respect to the second operation information acquiring unit based on the reference time as stored, the non-transitory computer-readable information storage medium recorded with the program further causing the computer to perform:
acquiring the stored reference time;
delaying the display-output of the game screen showing the content corresponding to the operation with respect to the first operation information acquiring unit based on the acquired reference time; and
updating, based on a maximum historical response time, the reference time as stored based on an acquired measurement result.

10. The game machine of claim 1, wherein the means for updating updates the reference time when a predetermined time has elapsed from a previous update of the reference time.

11. The game machine of claim 1, wherein the response time history data is multiplied by a coefficient to update the reference time.

12. The game machine of claim 1, wherein the reference time as updated comprises a mean value of the response time history data.

* * * * *